United States Patent [19]

Stefani

[11] Patent Number: 5,670,579

[45] Date of Patent: Sep. 23, 1997

[54] GOLF BALL COVER

[75] Inventor: Barbara Stefani, New Bedford, Mass.

[73] Assignee: Acushnet Company, Fairhaven, Mass.

[21] Appl. No.: 603,796

[22] Filed: Feb. 20, 1996

Related U.S. Application Data

[63] Continuation of Ser. No. 56,046, Apr. 30, 1993, Pat. No. 5,492,972, which is a continuation-in-part of Ser. No. 625,225, Dec. 10, 1990, abandoned.

[51] Int. Cl.$^6$ ................ A63B 37/12; C08K 3/14
[52] U.S. Cl. .............. 525/196; 125/221; 125/222; 125/330.2; 125/919; 524/908; 273/235 R; 428/402; 428/403
[58] Field of Search .................. 525/196, 221, 525/222, 330.2, 919; 524/908; 273/235 R; 428/402, 403

[56] References Cited

U.S. PATENT DOCUMENTS 5,000,459  3/1991  Isaac .................. 273/235 R
5,328,959  7/1994  Sullivan .................. 525/196
5,492,972  2/1996  Stefani .................. 525/196

OTHER PUBLICATIONS

Dupont Research Disclosure No. 27103—"Ionomer Blends For Golf Ball Covers" (Nov. 1986).

*Primary Examiner*—Samuel A. Acquah
*Assistant Examiner*—Duc Truong
*Attorney, Agent, or Firm*—Pennie & Edmonds LLP

[57] ABSTRACT

A polymer blend and a golf ball employing a cover formed of that composition are disclosed. The polymer blend is made from about 95 to about 50 parts by weight of one or more sodium ionomer resins, one of which has a lower flexural modulus than the other sodium ionomer. About 20 to about 50 parts by weight of a lithium ionomer resin is included in the blend. The ball that employs the cover has excellent spin characteristics.

8 Claims, No Drawings

GOLF BALL COVER

This is a continuation of application Ser. No. 08/056,046, filed Apr. 30, 1993, now U.S. Pat. No. 5,492,972, which was a continuation in-part of application Ser. No. 07/625,225, filed Dec. 10, 1990, now abandoned.

FIELD OF THE INVENTION

This invention relates to golf balls and, more particularly, to golf ball cover compositions comprising blends of one or more sodium ionomer resins and a lithium ionomer resin. Golf balls made with the cover composition of the present invention have been found to have good shear resistance, good initial velocity, and excellent spin rates.

BACKGROUND OF THE INVENTION

Generally, there are three types of golf balls in the market, namely one-piece, two-piece and wound. One-piece balls are molded from a homogeneous mass of material, while two-piece balls are made by molding a cover about a solid core. Wound balls are made by molding a cover about a wound core. A wound core is prepared by winding thin elastic thread about a center.

Golf ball cores, whether wound or solid, typically measure from 1.4 to 1.6 inches (3.5 to 4.1 cm) in diameter. The cover is molded about the core to form a golf ball having the minimum United States Golf Association (USGA) specified diameter of 1.68 inches (4.3 cm). Typically, the cover has a thickness of about 0.04 inches (0.1 cm).

Conventionally, both two-piece and wound golf balls are made by molding covers about cores in one of two ways: by injection molding fluid cover stock material around a core which is held in a retractable pin mold; or by compression molding preformed half-shells about the core. The preformed half-shells are formed by injecting fluid cover stock material into half-shell molds and solidifying the cover stock material into a half-shell shape.

Balata was the standard cover stock material until the middle 1960's when E. I. DuPont de Nemours and Co. discovered a new species of resins known as ionomer resins. These resins are sold under the trademark SURLYN™ and, to a large extent, have replaced balata as a cover stock material. Chemically, these ionomer resins are a copolymer of an olefin and an alpha, beta ethylenically unsaturated carboxylic acid with 10–90% of the carboxylic acid groups being neutralized by a metal ion. See U.S. Pat. No. 3,264,272. Today, the only commercially available ionomer resins are copolymers of ethylene and methacrylic or acrylic acid. These ionomer resins are distinguished by the type of metal ion, the amount of acid, and the degree of neutralization.

Dunlop Rubber Company obtained the first patent on the use of Surlyn for the cover of a golf ball, see U.S. Pat. No. 3,454,280 issued Jul. 8, 1969. Since then, there have been a number of disclosures on the use of these ionomer resins in the cover composition of a golf ball. See, for example, U.S. Pat. Nos. 3,819,768 issued Jun. 25, 1974; 4,323,247 issued Apr. 6, 1982; 4,526,375 issued Jul. 2, 1985; 4,884,814 issued Dec. 3, 1989; and 4,911,451 issued Mar. 27, 1990.

In November 1986 DuPont introduced a sodium and zinc ionomer resin having a low flexural modulus and suggested using and blending the same with other ionomer resins for making a golf ball cover. Golf ball covers made from these low flexural modulus ionomer resins have good shear resistance but very low velocity.

In December of 1986, DuPont introduced a lithium ionomer resin which was a copolymer of ethylene and methacrylic acid. These lithium ionomer resins have a very high flexural modulus, typically about 60,000 psi (415 MPa). DuPont suggested that lithium ionomer resins could be used to produce a golf ball cover which would be more cut resistant and harder than a cover made with either sodium or zinc ionomer resins. DuPont also suggested that a golf ball having a cover made from a lithium ionomer resin would go farther, have a higher coefficient of restitution and be less prone to cutting (i.e., more durable) than a golf ball made from other known ionomer resins such as sodium and zinc ionomer resins and blends thereof. DuPont further suggested that lithium ionomer resins could be used in blends with other ionomer resins where they can impart better cut resistance to those other resins.

The United States Golf Association (USGA) has promulgated a rule that no golf ball shall have an initial velocity that exceeds 255 feet (78 m) per second, i.e., 250 feet (76 m) per second with a 2% tolerance. Golf balls with covers made from ionomer resins with low flexural modulus are woefully below this maximum and, as should be appreciated, all golf ball manufacturers strive to come as close as possible to this limit.

For many years, the ball of choice among advanced amateur players and tour professionals has been the balata covered wound ball. This ball is favored because it achieves spin rates sufficient to enable the player to more precisely control ball direction and distance, particularly on shorter approach shots. Balata covered wound balls, however, are expensive.

In order to approximate the characteristics of balata covered wound balls at lower cost, the art has developed two piece balls of varying cover compositions. Despite numerous attempts to replicate the performance of balata covered wound balls, two piece balls generally suffer from low spin rates which makes them difficult to control near the greens. Also, two piece balls tend to have relatively poor click and feel.

A need therefore exists for a two piece ball which has spin rates approximating those of balata covered wound balls.

SUMMARY OF THE INVENTION

It has now been discovered that in a first embodiment of the invention that the initial velocity of a golf ball which uses a sodium ionomer resin having a low flexural modulus in the cover stock is increased by adding a lithium ionomer resin to the cover stock. It also has been discovered that in a second embodiment of the invention that the spin rate of a two-piece golf ball which uses a cover formed of a blend of one or more sodium ionomers and a lithium ionomer approaches that of a wound balata ball.

Broadly, and in the first embodiment of the invention, the golf ball cover composition is a blend comprising 95 to 50 parts by weight based on 100 parts by weight resin (phr) of a low flexural modulus sodium ionomer resin; and 5 to about 50 phr of a lithium ionomer resin. Preferably, the amount of low flexural modulus sodium ionomer resin is 90 to about 70 phr, more preferably 85 to 75 phr. Preferably, the amount of lithium ionomer resin is 10 to 30 phr, and more preferred 15 to 25 phr.

Preferably, the lithium ionomer resin employed in the cover blends of the invention is a copolymer comprising 95 to 80 parts by weight of ethylene and 5 to 20 parts by weight of acrylic or methacrylic acid, based on 100 parts by weight copolymer. Preferably, the lithium ionomer resin has 10% to 90% of the acid groups neutralized by lithium.

Preferably, the sodium ionomer resin employed in the cover blends of the invention is a copolymer comprising 95 to 80 parts by weight of copolymer of ethylene and 5 to 20 parts by weight of the copolymer of acrylic or methacrylic acid in which 10% to 90% of the acid groups are neutralized by sodium.

Alternatively, the sodium ionomer is a terpolymer comprising 5–50 weight percent of a softening comonomer such as n- or iso-butyl acrylate, 4–30 weight percent of either acrylic acid or methacrylic acid in which 5–95 percent of the acid groups are neutralized by sodium, and the remainder is ethylene comonomer.

Preferably, the lithium ionomer resin employed in the cover blends of the invention has a very high flexural modulus which is above about 60,000 psi (415 MPa). More preferably, the lithium ionomer resin used in the present invention has a flexural modulus between about 60,000 and about 80,000 psi (415 and 550 MPa). Good results have been obtained with lithium ionomer resins having flexural modulii in the range of about 60,000 psi to about 70,000 psi (415 to 485 MPa). The flexural modulus is measured in accordance with A.S.T.M. Method D-790.

Preferably, the sodium ionomer resins used in the present invention have flexural modulii between 1,000 and 20,000 psi (5 and 140 MPa), more preferably, between 2,000 and 10,000 psi (10 to 70 MPa).

Both the lithium and sodium ionomer resins preferably have 10% to 90% of their carboxylic acid groups neutralized by their respective metal ions More preferably, both the lithium and sodium ionomer resins have their carboxylic acid groups neutralized by 35% to 65% by the metal ion.

Preferably, the lithium and sodium ionomer resins have the same monocarboxylic acid, e.g. either methacrylic or acrylic acid.

In accordance with the invention, a polymer composition comprising a blend of a lithium ionomer with one or more of a first sodium ionomer and a second sodium ionomer is provided. The lithium ionomer is a copolymer comprising 95 to 80 parts by weight of ethylene and 5 to 20 parts by weight of acrylic or methacrylic acid, based on 100 parts by weight copolymer. The lithium ionomer preferably has a flexural modulus of 61,000 psi. The lithium ionomer can be 45–85 phr, preferably 50–75 phr, most preferably 50 phr of the composition.

In the polymer compositions of the invention, the first sodium ionomer preferably has a flexural modulus of nearly one tenth of the flexural modulus of the second sodium ionomer. The first sodium ionomer, however, is present in a greater amount than the second sodium ionomer. The first sodium ionomer can be 10–75 phr, preferably 45–75 phr, most preferably 45 phr of the composition, and the second sodium ionomer may be 0–15 phr, preferably 4–15 phr, most preferably 5 phr of the composition.

A golf ball having a cover comprising the polymer compositions described above also is provided.

Having briefly summarized the invention, the invention will now be described in detail by reference to the following specification and non-limiting examples. Unless otherwise specified, all temperatures are in degrees Celsius.

DETAILED DESCRIPTION OF THE INVENTION

To aid in the processing of fluid cover stock, it is conventional to use a plurality of ionomer resins to obtain the desired characteristics. Conventionally, ionomer resins with different melt flow indexes are employed to obtain the desired characteristics of the fluid cover stock. In order to adjust the characteristics of the fluid cover stock, other ionomer resins besides sodium and lithium can be employed.

Good results have been obtained with lithium ionomer resins sold under the trade name SURLYN 8118, 7930 and 7940 by DuPont. Sodium ionomer resins sold by DuPont under the name SURLYN 8269, SURLYN 8320, SURLYN 8265, SURLYN 8120, and SURLYN 8660 also work well in the present invention.

SURLYN 8118, 7930 and 7940 have flexural modulii of 61,000, 67,000 and 61,000 psi (420, 460 and 420 MPa) respectively. SURLYN 8269 and SURLYN 8320 each have a flexural modulus of 2,800 psi (20 MPa). SURLYN 8265 and SURLYN 8120 each have a flexural modulus of 7,100 psi (50 MPa), respectively. SURLYN 8660 has a flexural modulus 34,000 psi.

SURLYN 8118, 7930 and 7940 have melt flow indexes of about 1.4, 1.8 and 2.6 g/10 min., respectively. SURLYN 8269, SURLYN 8320, SURLYN 8265 and SURLYN 8120 each have a melt flow index of about 0.9 g/10 min. SURLYN 8660 has a melt flow index of 10 gm/10 min. Melt flow index is measured in accordance with A.S.T.M. Test D 1238, condition E, procedure A. Preferably, the blend of ionomer resins used to make a cover of a golf ball in accordance with the present invention has a melt flow index between about 1 to about 4 g/10 min., more preferably about 1 to about 3 g/10 min.

The combined amount of lithium ionomer resin and sodium ionomer resin used to make a cover in accordance with the present invention as herein described generally makes up at least about 90% by weight of the total weight of the golf ball cover and, preferably, at least about 95% by weight. Additional materials which may be included in the golf ball cover are other SURLYN resins; other resins such as polybutadiene, polyurethane and polyisoprene; whitening agents such as titanium dioxide; dyes; UV absorbers; optical brighteners; and other additives which are conventionally included in golf ball covers.

The golf ball covers made in accordance with the present invention are made in a conventional manner by molding cover stock formed of the ionomer blends about a core. Molding is accomplished either by injection molding cover stock about a core or by compression molding preformed half-shells of the cover stock about a core. The preferred method is compression molding. Half-shells are made by injection molding a cover stock into a conventional half-shell mold in conventional manner at about 450° F. for about 40 seconds.

The preformed half-shells are then placed about a core and the assembly is introduced into a compression molding machine. The compression molding machine is a hydraulic press having an upper and lower mold plate. As taught by U.S. Pat. No. 4,508,309, such mold plate has half molds, each of which is registered with another half mold in the opposite mold plate. It has been found that a golf ball is formed with a cover in accordance with the present invention when the half-shells are compression molded about a core at about 260° F.–300° F. for about 3 minutes. The molded balls are then cooled while still in the mold and removed when the cover is hard enough to be handled without deforming.

After the balls have been molded, they undergo various conventional finishing operations such as buffing, painting and stamping.

Preferably, the cover stock used to make golf ball covers in accordance with the present invention is a blend of lithium ionomer resin and at least one sodium ionomer resin in the amounts specified hereinabove. Blending of the ionomer resins is accomplished in a conventional manner using conventional equipment. Good results have been obtained by mixing the ionomer resins in a solid, pelletized form and then placing the mix into a hopper which is used to feed the heated barrel of the injection molding machine. Further mixing is accomplished by a screw in the heated barrel. The injection molding machine is used either to make preformed half-shells for compression molding about a core or for molding flowable cover stock about a core using a retractable-pin mold. Such machines are conventional.

These and other aspects of the present invention may be more fully understood by reference to the following examples.

EXAMPLE 1

This example compares a series of golf balls made in accordance with the present invention and a series of golf balls having a cover made from a cover stock using only lithium ionomer resin or sodium ionomer resin. The following ingredients are mixed to make cover stocks:

TABLE 1

| | Cover Stock (Amounts phr) | | | | | |
|---|---|---|---|---|---|---|
| INGREDIENTS | A | B | C | D | E | F |
| Surlyn 8118 (Lithium) | 25 | 25 | 20 | 15 | — | 100 |
| Surlyn 8269 (Sodium) | 25 | — | — | — | — | — |
| Surlyn 8265 (Sodium) | 50 | 75 | 80 | 85 | 100 | — |
| Blue-White Concentrate[1] Containing $TiO_2$ | 5 | 5 | 5 | 5 | 5 | 5 |

[1]From Quantum Chemical Co.

The cover stocks were used to make half-shells in a conventional half-shell injection molding machine which heats the cover stock to 232° C. and injects the fluid cover stock into molds. The half-shells were formed about the solid cores in a compression mold at 27°–138° C. for 10 minutes to yield golf balls with diameters of about 1.68 inches (4.3 cm) and nominal cover thicknesses of about 0.04 inches (0.1 cm).

Each series of balls made from the cover stocks were tested for initial velocity, hardness and cut resistance. The results from these tests were as follows:

TABLE 2

| | A | B | C | D | E | F |
|---|---|---|---|---|---|---|
| Initial Velocity | | | | | | |
| (ft/sec) | 247.45 | 247.54 | 247.26 | 247.02 | 246.41 | 251.32 |
| (m/sec) | 75.42 | 75.45 | 75.36 | 75.29 | 75.11 | 76.60 |
| Shore D Hardness | 54 | 58 | 56 | 55 | 50 | 69 |
| Cut Resistance | | | | | | |
| (inches) | 23 | 23 | 23 | 22 | 21 | 29 |
| (cm) | 58 | 58 | 58 | 56 | 53 | 74 |

These balls also were tested for shear resistance by projecting the ball against the club face of a Titleist DTR 5-Iron. The angle of impact of the ball on the club face is 50 degrees. Then, the amount of wear on the cover is visually observed. From this visual inspection it was noted that the ball made with cover stock E had the highest shear resistance while the ball made from cover stock F had the lowest. The balls made from cover stocks A–D showed good shear resistance which approached the shear resistance of the ball made from cover stock E.

In the guillotine test, a knife edge of 8 pounds (3629 grams) was impacted against the golf ball from various heights under the force of gravity. Cut resistance was determined by the maximum height to which the knife blade could be raised without cutting the cover of the golf ball on impact. A cut was defined as penetration completely through the cover; a mere crease in the golf ball was not considered to be a cut for testing purposes. The higher the blade had to be raised to cut the cover, the more cut resistant the golf ball was.

Shore D hardness is measured in accordance with A.S.T.M. D 2240-86 durometer hardness. Initial velocity is measured in a conventional manner.

In accordance with the second embodiment of the invention, golf balls employing covers formed from blends of one or more sodium ionomers, preferably two sodium ionomers and a lithium ionomer are produced. Preferably, the sodium ionomers have very large differences in melt flow indices and flexural modulii. The sodium ionomers may be from 15–80 phr, preferably 50 phr of the composition. The lithium ionomer may be 20–80 phr of the composition, preferably 50 phr. Surlyn 8320 may be 10–50 phr, preferably 20–45 phr, most preferably 45 phr of the cover composition; Surlyn 8660 may be 0–10 phr, preferably 5 phr; and Surlyn 7940 may be 45–85 phr, preferably 50–75 phr, most preferably 50 phr by weight. Compositions of suitable cover blends in accordance with this embodiment of the invention are given in Examples 2–9 in Table 3.

TABLE 3

| | (Amounts - phr) | | | | | | | |
|---|---|---|---|---|---|---|---|---|
| Ingredient | Example 2 | Example 3 | Example 4 | Example 5 | Example 6 | Example 7 | Example 8 | Example 9 |
| Surlyn 8320[1] | 45 | 10 | 15 | 20 | 25 | 30 | 50 | 75 |
| Surlyn 8660[2] | 5 | 5 | 5 | 5 | 5 | 5 | 5 | 5 |
| Surlyn 7940[3] | 50 | 85 | 80 | 75 | 70 | 65 | 45 | 20 |

[1]Sodium based ionomer from E.I. DuPunt de Nemours Co.
[2]Sodium based ionomer from E.I. DuPunt de Nemours Co.
[3]Lithium based ionomer from E.I. DuPunt de Nemours Co.

In accordance with the invention, it was found that balls using the cover blends of Examples 2–9 have spin rates intermediate between those of balata covered, wound balls and conventional two piece balls. Moreover, balls which employ covers formed of these terpolymers have click and feel superior to that of conventional two piece balls. The results are shown in Table 4.

TABLE 4

| Example No. | 2 | 3 | 4 | 5 | 6 | 7 | 8 | 9 |
|---|---|---|---|---|---|---|---|---|
| Spin Rate[1] | 3403 | 3300 | 3300 | 3300 | 3300 | 3300 | 3400 | 3600 |

[1]Spin rate is determined by using a True Temper machine equipped with a driver set up to match U.S.G.A. Standard Launch conditions.

By comparison, the spin rates of balata covered wound balls (Titleist Tour 100) is 3800 and a conventional two piece ball (Titleist HVC) is 3000.

Moreover, it is evident from Table 2 that golf ball covers of the present invention produce a faster ball and a more cut resistant ball than covers formed of soft sodium ionomer resin alone.

It will be understood that each and every numerical value which appears in the claims herein is modified by the term "about" if the modifying term "about" does not appear in front of such numerical value.

It will be understood that the claims are intended to cover all changes and modifications of the preferred embodiments of the invention, herein chosen for the purpose of illustration, which do not constitute a departure from the spirit and scope of the invention.

What is claimed is:

1. In a two-piece golf ball comprising a cover and a core, the improvement which comprises forming said cover from a blend of ionomer resins, said blend comprising from about 20 to about 45 phr of a first sodium ionomer having a first flexural modulus between about 1,000 and 20,000 psi, said first sodium ionomer being a terpolymer comprising about 5–50 weight percent of n- or iso-butyl acrylate, about 4–30 weight percent of acrylic or methacrylic acid in which 5–95 percent of the acid groups are neutralized by sodium and the remainder of ethylene;

up to about 10 phr of a second sodium ionomer having a second flexural modulus wherein said second sodium ionomer is a copolymer comprising about 95 to 80 parts by weight of ethylene and about 5 to 20 parts by weight of acrylic or methacrylic acid in which about 10 to 90% of the acid groups are neutralized by sodium; and from about 50 to about 75 phr of a lithium ionomer having a third flexural modulus of between about 60,000 and about 80,000 psi, wherein said lithium ionomer is a copolymer comprising about 95 to about 80 parts by weight of ethylene and about 5 to about 20 parts by weight of acrylic or methacrylic acid based upon 100 parts by weight copolymer, and further wherein about 10 to about 90% of the acid groups are neutralized by lithium.

2. The golf ball of claim 1 wherein the first flexural modulus is about one-tenth the second flexural modulus.

3. The golf ball of claim 1 wherein said blend has a melt flow index from about 1 to about 4 g/10 min.

4. The golf ball of claim 1 wherein said lithium ionomer has a flexural modulus of about 61,000 psi.

5. The golf ball of claim 1 wherein the first sodium ionomer is present in an amount of about 45 phr.

6. The golf ball of claim 1 wherein the second sodium ionomer is present in an amount of about 5 phr.

7. The golf ball of claim 4 wherein the lithium ionomer is present in an amount of about 50 phr.

8. In a two-piece golf ball comprising a cover and a core the improvement which comprises forming said cover from a blend of ionomer resins, said blend comprising:

about 45 phr of a first sodium ionomer having a first flexural modulus between about 1,000 and 20,000 psi, said first sodium ionomer being a terpolymer comprising about 5–50 weight percent of n- or iso-butyl acrylate, about 4–30 weight percent of acrylic or methacrylic acid in which 5–95 percent of the acid groups are neutralized by acid and the remainder of ethylene;

about 5 phr of a second sodium ionomer wherein said second sodium ionomer is a copolymer comprising about 95 to 80 parts by weight of ethylene and about 5 to 20 parts by weight of acrylic or methacrylic acid in which about 10 to 90% of the acid groups are neutralized by sodium, and about 50 phr of a lithium ionomer having a flexural modulus of between about 60,000 and about 80,000 psi, wherein said lithium ionomer is a copolymer comprising about 95 to about 80 parts by weight of ethylene and about 5 to 20 parts by weight of acrylic or methacrylic acid based upon 100 parts by weight copolymer, and further wherein about 10 to about 90% of the acid groups are neutralized by lithium.

* * * * *

UNITED STATES PATENT AND TRADEMARK OFFICE
CERTIFICATE OF CORRECTION

PATENT NO. : 5,670,579

DATED : September 23, 1997

INVENTOR(S) : Barbara Stefani

It is certified that error appears in the above-identified patent and that said Letters Patent is hereby corrected as shown below:

In column 5, at line 44, please change "27°" to read --127°--.

Signed and Sealed this

Ninth Day of December, 1997

BRUCE LEHMAN

Attest:

Attesting Officer

Commissioner of Patents and Trademarks